3,068,146
COMBATTING PATHOGENIC ORGANISMS BY MEANS OF N-HYDROXYMETHYLAMINO COMPOUNDS
Jean Heusser, Zurich, Switzerland, assignor to Hommel, S.A., Zurich, Switzerland
No Drawing. Filed Oct. 27, 1958, Ser. No. 769,567
Claims priority, application Switzerland Oct. 31, 1957
8 Claims. (Cl. 167—60)

The present invention relates to therapeutically useful compositions containing compounds including the N-hydroxymethylamino group or derivatives thereof, and to the use of said compositions in combatting pathogenic organisms.

It has been found that by the reaction of formaldehyde on piperazine (hexahydropyrazine, e.g. in the form of the hexahydrate) polymeric N-methylene-diethylene-diamine is formed and that upon treatment of the latter with an acid, the corresponding acid addition salt is obtained, in accordance with the following reaction scheme:

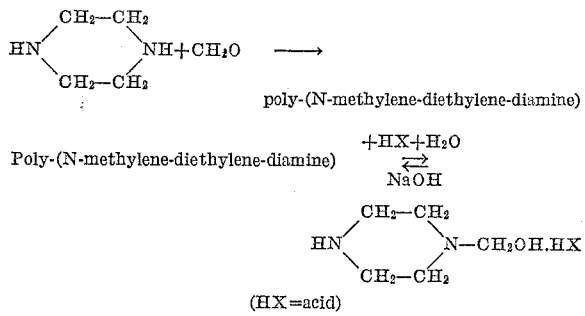

(HX=acid)

The reaction with the formaldehyde or with a formaldehyde-yielding agent can be carried out in an aqueous suspension or in an organic suspending agent or solvent, such for example as methanol. The reaction medium (e.g. solvent) can be removed upon completion of the reaction.

The mono-N-hydroxymethylamino compounds (salts) produced according to the foregoing reaction possess an outstanding action against Gram-positive and Gram-negative bacteria, pathogenic fungi and viruses. Thus, they have a bacteriostatic as well as a bactericidal action against staphylococci and Ps. pyocyaneus, for example, and are also effective bacteriostatically as well as bactericidally against e.g. thrush (Monilia albicans) and Trichophyton pedis (Kauffmann-Wolf), as well as against many other pathogenic microorganisms.

The aforesaid salts are thus useful therapeutic agents, especially disinfectants. It is not at all necessary that the said mono-N-hydroxymethyl amino salts be used as such against the pathogenic microorganisms. It is in fact advantageous to employ the intermediate polymeric stage—poly - (N - methylene - diethylene - diamine)— shown in the foregoing reaction scheme. This polymeric intermediate stage can then be converted in situ, so to speak, into the active form by means of subsequently added acid or by means of acid resulting from the metabolism of the microorganism or which can be present as metabolic product in the mucous membrane. It has been found that these acids are effective to react with the polymeric intermediate form at low concentrations and at moderate temperatures, such as e.g. body temperature (e.g. 37° C.).

A significant aspect of the invention is thus the possibility of advantageously using the aforesaid reaction principle to achieve a so-called "depot" effect. This is realized, as already essentially indicated, by gradually and continuously producing the effective monomeric substance from the polymeric intermediate stage at the sites of the desired antibacterial action, e.g. at a point on the mucous membrane.

The properties of the aforesaid salts make possible a wide variation in the form in which they are applied as disinfecting agents. These may assume the form of salves, powder, tinctures, tablets, etc. These may contain the salts or merely the polymeric intermediates, to be converted into the effective salts by means of acids. The acids may vary widely, and may comprise inorganic acids such as hydrochloric acid, hydrobromic acid, boric acid, acetic acid, etc., as well as organic acids such as N-hydroxymethylsarcosine, citric acid, maleic acid, ethanesulfonic acid, etc., the sole condition being that the acid and the resultant salt be physiologically tolerable.

A further aspect of the invention resides in the fact that the N-hydroxymethylsarcosine which is useful as an acid in the preparation of an effective salt according to the present invention, as previously indicated, is itself an effective disinfecting agent against Gram-positive and Gram-negative bacteria, as well as against pathogenic fungi and viruses, the activity being exhibited in its growth-inhibiting and killing action against such microorganisms. The N-hydroxymethyl-sarcosine is thus capable of effecting a dual function, first as a salt-forming acid in the sense of the previous disclosure and secondly as an effective disinfectant itself.

Advantage can be taken of the foregoing to develop a third and particularly advantageous aspect of the invention, namely, the embodiment of forms of application which contain the two aforesaid chemotherapeutic agents. Such embodiments preferably take the form of lozenges or troches constituted essentially by the aforementioned poly-(N-methylene-diethylene-diamine) itself or by the aforesaid salts or by a mixture of ingredients which can form such salts in situ; e.g. poly-(N-methylene-diethylene-diamine) and N-hydroxymethylsarcosine.

Lozenges thus constituted—and containing, if desired, any other ingredient or ingredients usual in lozenges—are especially useful for the local treatment, prophylactically and/or therapeutically, of infectious diseases of the oral and pharyngeal cavity.

It is noteworthy that such a lozenge provides a manifold source of bactericidal and bacteriostatic activities, and that each of the sources constituting the manifold source works in a slightly different manner from the other sources. Thus, the N-hydroxymethylsarcosine introduces immediate disinfection by its initial and immediate action, while the effect of the poly-(N-methylene-diethylene-diamine) sets in after a short, biologically occasioned, starting period. The effective activity of the combination is, however, maintained for some length of time, so that a depot-effect is obtained and a long-acting disinfection is realized.

The active ingredients of the said lozenge are free of undesirable side effects.

The effectiveness of the N-hydroxymethylsarcosine against pathogens is illustrated by the following results ascertained by the zone-of-inhibition method:

| | N-hydroxy-methyl sarcosine | | Hexamethylene tetramine | |
|---|---|---|---|---|
| | φ of zone | Bactericidal action | φ of zone | Bactericidal action |
| Staph. B1 | 70 | (+) | 25 | (−). |
| Coli | 45 | (+) | 10 | (−). |

φ of zone in mm.
+= destruction in the zone.
−=no destruction in the zone.

The effectiveness of the poly-(N-methylene-diethylene-diamine) against pathogens is also readily demonstrated.

Thus, saliva infected with haemolytic streptococci (155 organisms per milliliter of saliva) will contain no more of these living organisms after being in contact with 2 milligrams of poly-(N-methylene-diethylene-diamine) per milliliter of saliva for 10 minutes.

In the following exemplary embodiments of the invention, the parts are by weight unless otherwise indicated, and the relationship between parts by weight and parts by volume is the same as that between grams and milliliters. Percentages are by weight; temperatures are in degrees centigrade.

*Example 1*

19.4 parts of hexahydropyrazine hexahydrate (piperazine) are dissolved in 50 parts by volume of water. Thereupon, 7.9 parts by volume of an aqueous formaldehyde solution of 38% strength is added slowly. Upon warming the reaction mixture slightly, a voluminous white precipitate forms, and this is separated by suction filtration, and then washed with water and dried.

9.8 parts by weight of the so-obtained dry reaction product [poly-(N-methylene-diethylene-diamine)] are dissolved in 100 parts by volume of normal aqueous hydrochloric acid, and the solution dried in a vacuum desiccator at room temperature (20 to 30°). There are obtained 15 parts by weight of weakly yellow-colored mono - N - hydroxymethyl - diethylenediamine monohydrochloride, which melts at about 175° with decomposition.

*Example 2*

19.4 parts of hexahydropyrazine hexahydrate are thoroughly admixed with 3.0 parts of paraformaldehyde. 100 parts by volume are then added to the solution, which is thereupon heated for 3 hours on the water bath. After cooling, the reaction product is separated by suction filtration, and then washed with water and dried.

918 parts of the so-obtained dry reaction product are dissolved in 100 parts by volume of normal methanolic hydrochloric acid, after which the methyl alcohol is removed by cautious distillation under reduced pressure. The residue is mono-N-hydroxymethyl-diethylenediamine monohydrochloride and melts at about 175° with decomposition.

*Example 3*

19.4 parts of hexahydropyrazine hexahydrate are dissolved in 50 parts by volume of water. Thereupon, 7.9 parts by volume of an aqueous formaldehyde solution of 38% strength is added slowly. Upon warming the reaction mixture slightly, a voluminous white precipitate forms, and this is separated by suction filtration, and then washed with water and dried.

9.8 parts of the so-obtained dry reaction product are suspended in water, and then 7.3 parts of adipic acid are added. After dissolution has been completed, the water is removed in a vacuum desiccator, leaving the formed mono - N - hydroxymethyl - diethylenediamine-adipate as residue. The product has a brown coloration and melts at about 232° with decomposition.

*Example 4*

19.4 parts of hexahydropyrazine hexahydrate (piperazine) are dissolved in 50 parts by volume of water. Thereupon, 7.9 parts by volume of an aqueous formaldehyde solution of 38% strength is added slowly. Upon warming the reaction mixture slightly, a voluminous white precipitate forms, and this is separated by suction filtration, and then washed with water and dried.

The so-obtained polymeric condensation product is admixed, e.g. with N-hydroxymethylsarcosine, and the mixture made up in per se conventional manner—i.e. with usual additaments, e.g. sugar and the like—into the form of lozenges or troches. Upon insertion of such a lozenge or troche into the mouth, the action of the saliva converts the mixture into the mono-N-hydroxymethyl-piperazine-N-hydroxymethylsarcosine salt, which is active, bacteriostatically and bactericidally, against e.g. *Streptococcus haemolyt.*, Type A 14, *B. diphtheriae*, *Staphylococcus haemolyt.*, Oxford strain, *Pseudomonas pyoc.*, etc. The N-hydroxymethylsarcosine salt itself acts bacteriostatically and bactericidally as hereinbefore explained, and this applies also to any free poly-(N-methylene-diethylene-diamine) present.

A preferred admixture in lozenge form contains about 2 parts of N-hydroxymethylsarcosine per 10 parts of poly-(N-methylene-diethylene-diamine). Thus an illustrative composition may contain:

| | Mg. |
|---|---|
| Poly-N-methylene-diethylene-diamine) | 10 |
| N-hydroxymethylsarcosine | 2 |
| Tetracaine hydrochloride | 0.25 |

Other conventional lozenge-forming ingredients may also be present. Thus, among other things, menthol may be present to give a cooling effect. The tetracaine hydrochloride may be omitted; its presence gives a rapid onset of analgesic influence which may be desirable in some cases.

Lozenges prepared according to this invention are useful prophylactically for protection against droplet infections in crowds during "flu" periods, and during periods of high susceptibility to rhinitis and colds. They are useful therapeutically against infections of the mouth and pharynx, tracheitis, gingivitis, oral thrush, etc. They may also be used postoperatively, e.g. after a tonsillectomy or after extraction of teeth. Useful doses are, for prophylactic purposes, 3 to 4 lozenges daily; for therapeutic purposes 4 to 8 lozenges daily, as required.

*Example 5*

19.4 parts of hexahydropyrazine hexahydrate (piperazine) are dissolved in 50 parts by volume of water. Thereupon, 7.9 parts by volume of an aqueous formaldehyde solution of 38% strength is added slowly. Upon warming the reaction mixture slightly, a voluminous white precipitate forms, and this is separated by suction filtration, and then washed with water and dried.

The so-obtained polymeric condensation product is admixed with boric acid, using equimolar quantities, and the resulting mixture incorporated into an ointment base which, per se, may be conventional. The polymer is converted into the mono-N-hydroxymethyl-diethylene-diamine-borate at the point of application. This salt has excellent antibacterial properties e.g. in the form of a 1% ointment.

*Example 6*

45 parts of sarcosine are dissolved in 60 parts by volume of aqueous formaldehyde (38%), and the solution filtered. The solution is then held at 40° for two hours, and the part of the water distilled off under reduced pressure and while keeping the temperature below 30°. The residue is then maintained for 48 hours at 5 to 10°, whereupon N-hydroxymethyl-sarcosine crystallizes out slowly. The crystals are separated by suction filtration and then washed with acetone. After drying, the yield of N-hydroxymethylsarcosine is 55 parts.

Having thus disclosed the invention, what is claimed is:

1. The method of combatting pathogenic bacteria which comprises disinfecting the site of said bacteria by applying to said site poly-(N-methylene-diethylene-diamine).

2. The method of combatting pathogenic bacteria which comprises disinfecting the site of said bacteria by applying to said site an addition salt of mono-N-hydroxymethyl-diethylenediamine with a physiologically acceptable acid.

3. The method of combatting pathogenic bacteria which comprises disinfecting the site of said bacteria by producing in situ an addition salt of mono-N-hydroxymethyldiethylenediamine with a physiologically acceptable acid by the reaction at said site of poly-(N-methylene-diethylenediamine) and said acid.

4. An oral disinfectant containing as essential active disinfecting ingredients poly-(N-methylene-diethylenediamine) and N-hydroxymethylsarcosine.

5. A method of disinfecting the oral cavity which comprises bringing poly-(N-methylene-diethylene-diamine) into contact with the mucous membrane, whereby conversion into a bactericidally and bacteriostatically active salt of mono-N-hydroxymethyl-diethylenediamine is effected in situ on said membrane.

6. The method of combatting pathogenic viruses which comprises applying to the site of said viruses poly-(N-methylene-diethylene-diamine).

7. The method of combatting pathogenic body conditions produced by a member selected from the group consisting of pathogenic bacteria, pathogenic fungi and viruses which comprises applying poly-(N-methylene-diethylenediamine) to pathogenically affected body surfaces.

8. The method of protecting body surfaces against pathogenic conditions produced by a member selected from the group consisting of pathogenic bacteria, pathogenic fungi and viruses which comprises applying poly-(N-methylene-diethylene-diamine) to body surfaces exposed to pathogenic influences.

References Cited in the file of this patent

UNITED STATES PATENTS

| | | |
|---|---|---|
| 2,368,521 | Clifford | Jan. 30, 1945 |
| 2,542,886 | Wach | Feb. 20, 1951 |
| 2,639,284 | Morren | May 19, 1953 |
| 2,643,255 | Morren | June 23, 1953 |
| 2,739,981 | Szabo | Mar. 27, 1956 |
| 2,806,814 | Richter | Sept. 17, 1957 |
| 2,840,600 | Brow | June 24, 1958 |
| 2,868,833 | Szabo | Jan. 13, 1959 |

OTHER REFERENCES

Brown et al.: Chem. Abst., vol. 48 (1954), page 8945d and p, 1452s of Subject Index N–Z of vol. 48.

Kushner: Annals of N.Y. Academy of Science, vol. 50, art. 2, May 25, 1948, pages 21, 26, 120–127.

Merck Index, 5th Ed., 1940, p. 353.

Organic Chemistry, by Paul Karrer, 2nd Ed., 1946, pp. 156–59.